(12) United States Patent
Rulkens

(10) Patent No.: US 9,890,247 B2
(45) Date of Patent: Feb. 13, 2018

(54) SEMI-AROMATIC POLYAMIDE

(75) Inventor: Rudy Rulkens, Margraten (NL)

(73) Assignee: DSM IP ASSETS B.V., Heerlen (NL)

( * ) Notice: Subject to any disclaimer, the term of this patent is extended or adjusted under 35 U.S.C. 154(b) by 796 days.

(21) Appl. No.: 13/695,345

(22) PCT Filed: Apr. 28, 2011

(86) PCT No.: PCT/EP2011/056713
§ 371 (c)(1),
(2), (4) Date: Jan. 8, 2013

(87) PCT Pub. No.: WO2011/135018
PCT Pub. Date: Nov. 3, 2011

(65) Prior Publication Data
US 2013/0150525 A1 Jun. 13, 2013

(30) Foreign Application Priority Data

Apr. 29, 2010 (EP) .................... 10161459

(51) Int. Cl.
*C08L 77/00* (2006.01)
*C08G 69/26* (2006.01)
*C08G 69/28* (2006.01)
*C08L 77/06* (2006.01)

(52) U.S. Cl.
CPC ........... *C08G 69/265* (2013.01); *C08G 69/28* (2013.01); *C08L 77/06* (2013.01)

(58) Field of Classification Search
CPC ....... C08L 77/06; C08G 69/265; C08G 69/28; C08G 69/02; C08G 69/04
USPC ....................................... 524/607
See application file for complete search history.

(56) References Cited

U.S. PATENT DOCUMENTS

| 5,079,307 | A | 1/1992 | Taylor et al. | |
|---|---|---|---|---|
| 6,747,120 | B2 * | 6/2004 | Rulkens et al. | 528/310 |
| 2002/0183479 | A1 | 12/2002 | Rulkens et al. | |
| 2008/0274355 | A1 | 11/2008 | Hewel | |
| 2009/0127740 | A1 * | 5/2009 | Kirchner | C08L 77/06 264/272.11 |
| 2009/0227760 | A1 * | 9/2009 | Warren et al. | 528/324 |
| 2010/0063245 | A1 | 3/2010 | Rulkens | |
| 2010/0190934 | A1 * | 7/2010 | Desbois et al. | 526/64 |
| 2011/0015328 | A1 * | 1/2011 | Orihashi | C08L 77/06 524/443 |
| 2013/0231424 | A1 * | 9/2013 | Anada | C08J 5/18 524/126 |
| 2014/0228489 | A1 * | 8/2014 | Nakai | C08G 69/26 524/120 |
| 2015/0252158 | A1 * | 9/2015 | Inui | C08L 77/06 525/184 |
| 2015/0291794 | A1 * | 10/2015 | Blondel | C08G 69/36 524/413 |
| 2016/0168381 | A1 * | 6/2016 | Washio | C08L 23/26 252/511 |

FOREIGN PATENT DOCUMENTS

JP 04-053826 2/1992
WO WO 2008/155281 A1 * 12/2008 ............. C08G 69/26

OTHER PUBLICATIONS

International Search Report for PCT/EP2011/056713, dated Jul. 14, 2011.

* cited by examiner

*Primary Examiner* — Jane L Stanley
(74) *Attorney, Agent, or Firm* — Nixon & Vanderhye P.C.

(57) ABSTRACT

The invention relates to a semi-aromatic polyamide, and a polyamide composition comprising the semi-aromatic polyamide, comprising a diamine component (a) comprising, based on the total number of moles of the diamine component (a): between 5 and 30 mole % of at least one C2-C5 diamine, between 5 and 30 mole % of at least one C7+ diamine, and between 45 and 90 mole % of a C6 diamine; and a dicaboxylic acid component (b) comprising, based on the total number of moles of the dicaboxylic acid component (b): at least 50 mole % of terephthalic acid and at most 50 mole % of another dicarboxylic acid.

10 Claims, No Drawings

SEMI-AROMATIC POLYAMIDE

This application is the U.S. national phase of International Application No. PCT/EP2011/056713, filed 28 Apr. 2011, which designated the U.S. and claims priority to EP Application No. 10161459.2 filed 29 Apr. 2010, the entire contents of each of which are hereby incorporated by reference.

The invention relates to a semi-aromatic polyamide, more particular to a semi-crystalline semi-aromatic polyamide having a high melting temperature. The present invention also relates to a polyamide molding composition comprising the above polyamide, and to an article or a part of an article comprising the above polyamide or polyamide composition.

Over the last years, there has been a strong demand for the development of polyamides having a high melting point, and which would further beneficially exhibit a high heat deflection temperature, an increased heat resistance and increased melt stability, while retaining good moldability and excellent dimensional stability as well as attractive cost characteristics. These polyamides would be suitable for several highly demanding applications, like for instance for the manufacturing of electric or electronic parts, which require good melt flow and solder resistance, in particular concerning blister resistance during soldering processes, and car engine parts, which require better heat resistance. Performance requirements are raised year over year.

Problems to be dealt with include: side reactions resulting in branching and uncontrolled increase in molecular weight or stopping of the polymerization prior to reaching the desired Mw, too much water absorption, too low melting temperature and/or too low glass transition temperature.

Aliphatic polyamides comprising 1,6-hexanediamine and adipic acid as main components (PA-66) and 1,4-butanediamine and adipic acid as main components (PA-46) have been widely used as respectively general-purpose and high heat engineering plastics. However, these aliphatic polyamides show poor dimensional stability because of a prominent tendency to absorb water. Moreover, PA-66 exhibits a poor heat resistance.

In order to meet the above mentioned requirements, and to combat the water absorption, semi-aromatic polyamides have been proposed and some put into practical use, notably polyphthalamides comprising 1,6-hexanediamine and terephthalic acid as main components (PA-6T) and derivatives thereof. PA-6T cannot be melt molded since its melting point is so high (i.e. 370° C.) that largely exceeds its decomposition temperature. It is known that PA-6T can be modified by replacing relatively large amounts of terephthalic acid by adipic acid and/or isophthalic acid, thus obtaining copolyphthalamides (PA-6T/66; PA-6T/6I; PA-6T/66/6I) which have good melt moldability and yet relatively high melting points (typically in the range 290-320° C.). However, the incorporation of these additional dicarboxylic acids, which is effective in decreasing the melting point and improving the processability, also decreases other properties like, notably, the rate of crystallization and the attainable degree of crystallization, thereby deteriorating obtainable properties such as rigidity at high temperatures, chemical resistance and dimensional stability relating to moisture uptake. In particular the 1,6-hexanediamine/adipic acid amide links are thermally weak, being liable for increasing degradation at temperatures above 300° C.

Modification of PA-6T with other diamines has also been considered, e.g. with long chain diamines, for example 1,9-nonanediamine, resulting in PA-6T/9T copolymers, or 1,10-decane diamine, resulting in PA-6T/10T copolymers, or with short chain diamines, for example, 1,4-butanediamine, resulting in PA-6T/4T copolymers. PA-6T/9T and PA-6T/10T copolymers are attractive for their low water absorption. PA-6T/9T copolymers are described in WO2007/071790-A1. PA-6T/10T copolymers are described in EP-1988113-A1. PA-6T/4T copolymers are described in EP-1226202-A1. Each of these copolymers has its own limitations: PA-6T/4T is difficult to produce with sufficiently high molecular weight. PA-6T/9T, PA-6T/9T/Me8T and PA-6T/10T with a high long chain diamine content show at equal molar comonomer content a significant drop in melting temperature, low crystallinity and, compared to PA-6T/66 and PA-6T/6I, low stiffness at room temperature, PA 6T based copolyamides with a long chain diamine such as for example PA-6T/10T and PA-6T/9T and PA-6T/9T/Me8T, like PA-6T/6I, are also more prone to crosslinking or post-condensation resulting in uncontrolled increase in molecular weight. Generally these polyamides need the use of a chain stopper to control the molecular weight. However this compensates only for one specific amount of cross-linking. In practice the cross linking is caused by unwanted amine condensation like in case of HMDA leads to trifunctional bis-hexamethylenetriamine comonomers, as described for example in EP 0299444A2. The process conditions and stability of the process determine the amount of this side reaction compared to the main reaction, the amidation, which is needed to reach the required molar mass. Especially the harsh reaction conditions needed to produce or process high melting PA-6T-based copolyamides, enhance side reactions, and reduce control over and increase a mismatch in molecular weight. Adjustment by introduction of a fixed amount of chain stopper is often not optimal, limiting the processing window for processing.

On the other hand short chain diamines lead to cyclic amine condensation for diamines with 4 or 5 carbon atoms in the chain. The so formed cyclic secundairy amines act as a chain stopper. Furthermore, due to their volatile character, an unwanted unbalance in NH2 and CO2H groups can occur, which has to be compensated by adding the diamine in excess, as mentioned for example in U.S. Pat. No. 5,270,437-A.

The aim of the present invention is to provide a high melting polyamide with high crystallinity, which exhibits good high temperature properties and processability, meanwhile showing less of the disadvantages discussed above.

This aim has been achieved with the semi-aromatic polyamide according to the invention, and the composition comprising said semi-aromatic polyamide.

A first embodiment of the invention concerns a semi-aromatic polyamide derived from a diamine component and a dicaboxylic acid component.

A second embodiment of the invention concerns a polyamide molding composition comprising said semi-aromatic polyamide.

A third embodiment of the invention concerns a process for making said semi-aromatic polyamide.

The semi-aromatic polyamide according to the invention comprises:
  a diamine component (a) comprising, based on the total number of moles of the diamine component (a):
    5-30 mole % of at least one C2-C5 diamine,
    5-30 mole % of at least one with at least 7 C-atoms, and
    50-90 mole % of a C6 diamine
  wherein the mole % are relative to the total molar amount of diamine component (a), and wherein the C6 diamine consists for at least 75 mole % of 1,6-hexanediamine, relative to the total molar amount of C6 diamine;
a dicarboxylic acid component (b) comprising, based on the total number of moles of the dicaboxylic acid component (b)
60-100 mole % of terephthalic acid
0-40 mole % of another dicarboxylic acid
wherein the mole % are relative to the total amount of dicarboxylic acid component.

The diamine with at least 7 C-atoms will herein be denoted and referred to as C7+ diamine.

The advantage of the semi-aromatic polyamide according to the invention is that amount of the C7+ diamine can be varied over a relative large range, with retention of high melting temperature (Tm), relatively high glass transition temperature (Tg), and high crystallinity, the polyamide can produced with a high Mw with less risk of crosslinking without the need of using a chain stopper. Moreover, the semi-aromatic polyamide may comprise a relative large amount of other dicarboxylic acids including aliphatic dicarboxylic acids while still retaining a relative high melting point and relative high crystallinity leading to a high stiffness over the whole T range from below room temperature and above, and especially above glass transition temperature (Tg), up to the melting point.

Preferably, the C7+ diamine is present in a larger amount than the C2-C5 diamine. The amount of the C2-C5 diamine is preferably in the range of 5-20 mole %, more preferably 5-15 mole %. The amount of the C7+ diamine is preferably in the range of 10-25 mole %, more preferably 10-20 mole %. Herein the mole % of the diamines is relative to the total amount of diamine component (a).

Examples of suitable C2-C5 diamines include 1,2-ethylene diamine, 1,2-propylene diamine, 1,3-propylene diamine, 1,4-butylene diamine and 2-methyl-1,4-butylene diamine, 1,5-pentane diamine, and any mixtures or combinations thereof. Preferably, the C2-C5 diamine comprises or even better consists 1,4-butylene diamine, also known as 1,4-diaminobutane and 1,4-butanediamine.

Examples of suitable C7+ diamines are 1,7-heptane diamine, 1,8-octane diamine, 2-methyl-1,8-octane diamine, 1,9-nonane-diamine, 1,10-decanediamine, 1,11-undecanediamine, 1,12-dodecanediamine and 1,18-octadecanediamine. Preferably, the C7+ diamine comprises a C9-C12 diamine, and more preferably, consists of any one of 2-methyl-1,8-octane diamine, 1,9-nonane-diamine, 1,10-decanediamine, 1,11-undecanediamine, and 1,12-dodecanediamine, or any mixture or combinations thereof.

The C6 diamine consists predominantly of 1,6-hexanediamine, i.e. for at least 75 mole %. Preferably, the content of 1,6-hexanediamine, relative to the total molar amount of C6 diamine, is at least 90 mole %, and more preferably in the range of 95-100 mole %. Other C6 diamines, such as 2-methyl-1,5pentane diamine, may be present, but only in limited amounts, i.e. at most 25 mole %, preferably at most 10 mole %, and more preferably in the range of 0-5 mole %.

The dicarboxylic acid component in the semi-aromatic polyamide according to the invention may comprise, next to terephthalic acid, other dicaboxylic acids, such as isophthalic acid and/or adipic acid. Preferably, such other dicarboxylic acid comprises less isophthalic acid than adipic acid, and preferably consists of adipic acid. The amount of such other dicarboxylic acid, if present at all, is preferably limited to at most 40 mole %, more preferably at most 25 mole %, relative to the total amount of dicarboxylic acid component. This limitation reduces the drop in melt temperature, improves the thermal stability of the semi-aromatic polyamide and reduces the formation of branched structures during the polymerization process.

The dicarboxylic acid component in the semi-aromatic polyamide according to the invention preferably comprises 60-95 mole % terephthalic acid.

A higher amount of terephthalic acid is advantageous for obtaining a higher Tg. The presence of aliphatic dicarboxylic acid increases the reactivity and suppresses side reactions, thus allowing for higher molecular weights with less risk of crosslinking of the polymer.

The semi-aromatic polyamide according to the invention may comprise, next to the diamine component and dicaboxylic acid component, other components such as components derived from amino acids and/or cyclic lactams, trifunctional components such as triamine components and/or trifunctional carboxylic acids, and monofunctional components such as mono amines and/or mono carboxylic acids. Such other components are preferably used in small amounts, if any. Suitably, the amount of such other components is in the range of 0-5 mole %, more preferably 0-1 mole %, and most preferably 0-0.5 mole %, relative to the total molar amount of the diamine component and the dicaboxylic acid component.

Suitably, trifunctional components and monofunctional components are not used at all, since with the composition of the polyamide according to the invention such components are neither necessary for obtaining to obtain a high Mw, nor necessary for obtaining a good thermal stability of the polymer.

The semi-aromatic polyamide according to the invention suitably has a melting temperature (Tm) in the range of 300-340° C., and preferably 310-330° C.

The semi-aromatic polyamide also suitably has a glass transition temperature (Tg) in the range of 105-130° C., and preferably 110-125° C.

With the term glass transition temperature (Tg) is herein understood the temperature, measured according to ASTM E 1356-91 by DSC with a heating rate of 20° C./minute and determined as the temperature at the peak of the first derivative (with respect of time) of the parent thermal curve corresponding with the inflection point of the parent thermal curve. With the term melting point (temperature) is herein understood the temperature, measured according to ASTM D3418-97 by DSC with a heating rate of 20° C./min, falling in the melting range and showing the highest melting rate.

The semi-aromatic polyamide with a higher Tm and higher Tg can be prepared using relatively larger amounts of the C6 diamine and terephthalic acids and smaller amounts of other diamines, in particular of the C7+ diamine, and smaller amounts of aliphatic dicarboxylic acid, whereas other dicarboxylic acids mainly affect the Tm.

The semi-aromatic polyamide can be made with a lower Tm and lower Tg using relative lower amounts of the C6 diamine and/or terephthalic acids and higher amounts of other diamines, in particular of the C7+ diamine, and/or lower amounts of other dicarboxylic acid.

The semi-aromatic polyamide according the invention can be prepared by conventional methods, including melt-polymerization, as well as a by two-step polymerization process comprising first preparing a prepolymer and subsequently further polymerizing of the prepolymer to the required polymer. The further polymerization may be performed in the melt, e.g. in an extruder, or the solid state. The latter process is also known as solid state post condensation (SSPC).

The third embodiment of the invention relates to a melt process for making the polyamide according to the invention. For the polymerization in the melt, it is advantageous to first make a prepolymer from all diamine and diamine components and optionally other components, except for an amount of the C7+ diamine. This process is advantageously applied for all copolyamides comprising monomeric units derived from a long chain diamine and a short chain diamine. An amount of the long chain diamine, in casu the C7+ diamine, is withheld during the preparation of the prepolymer, and is added afterwards during the polymerization in the melt. In this way, a polymer with a high molecular weight is produced in a very fast and reproducible manner. The amount of long chain diamine withheld is not critical, other than that it will be sufficient to have a monomer mixture comprising an excess of dicarboxylic acid components, thereby resulting in a prepolymer comprise predominantly carboxylic acid end groups. The withheld amount suitably is in the range of 1-20 mole %, preferably 2-15 mole %, and most suitably 5-10 mole %, relative to the total molar amount of diamines. A diamine with 10 C-atoms or more has the specific advantage that it is more efficiently incorporated in the melt polymerization of the prepolymer.

The invention also relates to a polyamide molding composition. The polyamide molding composition according the invention comprises the semi-aromatic polyamide according to the invention, or any preferred embodiment thereof, described herein above, and at least one other component. Suitable other components are reinforcing agents, such as glass fibers and carbon fibers; fillers, such as inorganic fillers and clays; additives, such as stabilizers, pigments, nucleating agents, lubricants, plasticizers, antistatic agents, flame retardants and flame retardant synergists, etc; and other polymers, such as halogenated polymers.

The polyamide molding composition suitably consists of
(A) 30-100 wt. % of a semi-aromatic polyamide as according to the invention, or any preferred embodiment thereof, described herein,
(B) 0-70 wt. % of reinforcing agents and/or fillers, and
(C) 0-50 wt % of other additives and/or other polymers.
Herein the total amount of (A), (B) and (C) equals 100 wt %.

The semi-aromatic polyamide and the polyamide molding composition according to the invention are usable in practice. They can be easily pelletized. The can be molded by conventional molding processes, such as extrusion, compression and injection, processes. They can be formed into shaped articles generally used in engineering plastics, films, household goods.

The invention is further illustrated with the following examples and comparative experiments.

Test Methods
Thermal Characterisation by DSC. (According to ASTM D3418-97 (Tm) and ASTM E 1356-91 (Tg))

Determination of $T_m$: The measurements of the second melting temperature $T_m$ were carried out with a Mettler Toledo Star System (DSC) using a heating and cooling rate of 20° C./min. in an $N_2$ atmosphere. For the measurements a sample of about 5 mg pre-dried powdered polymer was used. The predrying was carried out at high vacuum, i.e less than 50 mbar and a 105° C. during 16 hrs. The polyamide sample was heated from 20° C. to 380° C. at 20° C./min, immediately cooled to 20° C. at 20° C./min and subsequently heated to 380° C. again at 20° C./min. For the second melting temperature $T_m$ the peak value of the melting peak in the second heating cycle was determined. The glass transition temperature (Tg) is taken from the second heating.

Viscosity Number (VN)
The viscosity number (VN) was measured according to ISO 307, fourth edition. For the measurement a pre-dried polymer sample was used, the drying of which was performed under high vacuum (i.e. less than 50 mbar) at 80° C. during 24 hrs. Determination of the relative viscosity was done at a concentration of 0.5 gram of polymer in 100 ml of sulphuric acid 96.00±0.15% m/m at 25.00±0.05° C. The flow time of the solution (t) and the solvent (to) were measured using a DIN-Ubbelohde from Schott (ref. no. 53020) at 25° C. The VN is defined as $$VN = \frac{\left(\frac{t}{t_0} - 1\right)}{c} = \left(\frac{t}{t_0} - 1\right) * 200$$

wherein:
VN=viscosity number (ml/g)
t=average flow time of the sample solution, in seconds
$t_0$=average flow time of the solvent, in seconds
c=concentration, g/ml (=0.005)

Water Absorption
The water absorption was measured by immersing a 0.8 mm Campus UL bar made of a polyamide in water for 14 days at 40° C.

Thermal Stability
The thermal stability was measured by wt. % of weight loss per minute as determined by isothermal TGA. Isothermal TGA was performed on a Perkin-Elmer TGA7 thermo balance. About 5 mg predried powdered polymer sample was used (high vacuum, <50 mbar T=105° C. during 16 hrs). The measurement was performed by heating the sample in a Helium atmosphere at 40° C./min from 20° C. to 380° C. and keeping them at 380° C. for 1 hour. The start of heating at 20° C. was taken as time t=0 min. For the period between time t=15 min and t=30 min, the average slope of the TGA curve was determined and expressed as the weight loss, relative to the initial weight in percentage, per minute.

Polymers
Polyamides were prepared from different monomer compositions using standard polymerization conditions, and extruded on an extruder and granulated using a standard extruding and granulation process. Physical properties of the resulting product were measured using the following test methods. The polymer compositions and test results have been summarized in Table 1.

EXAMPLE I

A mixture of 36.34 g (0.188 mol+0.088 mol excess) of tetramethylene diamine (67 wt. % aqueous solution), 619.47 g (3.198 mol) hexamethylene diamine (60 wt. % aqueous solution), 32.35 g (0.188 mol) decanediamine, water, sufficient to provide a 55 wt. % water content in the salt solution, 0.36 g sodium hypophosphite monohydrate, 147.71 g (1.011 mol) adipic acid and 431.71 g (2.599 mol) terephthalic acid was stirred in a 2.5 liter autoclave with heating and with distillative removal of water. The removal of water occurred at 5 bara in 30 minutes up to a 72 wt. % aqueous salt solution and at 12 bara in another 30 minutes to 90 wt. % aqueous salt solution. Then the autoclave was closed. The polymerisation was effected at increasing temperatures to 250° C. in 10 minutes and keeping it for 15 minutes at 250° C., after which the autoclave's contents were flashed and the resulting solid product was cooled further under nitrogen. The prepolymer thus obtained was subsequently crushed to particles sized between 1-20 mm. The prepolymer was dried and post-condensed in the solid phase in a metal tube reactor (d=85 mm) for 2 hours heating at 200° C. under a stream of nitrogen (2400 g/h) and then under a stream of nitrogen/water vapour (3/1 weight ratio, 2400 g/h)) for 2 hours at 225° C. and 16 hours at 260° C. Then the polymer was cooled to room temperature.

EXAMPLES II-VI AND REFERENCE EXAMPLES A-F

These examples were performed in the same way as example 1, with the same molar amount of total dicarboxylic acids as in example 1 and the molar ratios from tables 1 and 2, with a DAB excess in g/kg polyamide salt calculated as: C4*0.15, where C4 is in mol % of total diamine and the total amount of polyamide salt used is equal to that in example 1. In all examples, 0.35 g sodium hypophosphite monohydrate was used.

Injection Moulding

The polyamides described above were used for making injection moulded parts. For injection moulding the materials were pre-dried prior to use, by applying the following conditions: the copolyamides were heated under vacuum of 0.02 MPa to 80° C. and kept at that temperature and pressure for 24 hrs while a stream of nitrogen was passed. The pre-dried materials were injection moulded on an Arburg 5 injection moulding machine with a 22 mm screw diameter and a Campus UL 0.8 mm 2 body injection mould. The temperature of the cylinder wall was set at 345° C., and the temperature of the mould was set at 140° C. The Campus UL bars thus obtained were used for further tests.

TABLE 1 polymer compositions and test results of examples according to the invention; VN1 = VN of base polymer, VN2 is VN after injection molding, WA = water uptake. The amounts of the diamines and diacids are indicated in the mole % relative to the total molar amount of the diamines respectively of the diacids.

| | Diamines | | | Diacids | | Properties | | | |
|---|---|---|---|---|---|---|---|---|---|
| Example | C6 | C4 | C10 | T | C6 | Tm(° C.) | Tg(° C.) | VN1-VN2 (ml/g) | WA (wt. %) |
| EX-I | 88.6 | 5.2 | 5.2 | 72 | 28 | 319 | 108 | 200-220 | 6.12 |
| EX-II | 78 | 11 | 11 | 81.5 | 18.5 | 319 | 114 | 140-145 | 5.70 |
| EX-III | 73 | 9 | 18 | 85 | 15 | 317 | 116 | 160-165 | 5.22 |
| EX-IV | 56 | 22 | 22 | 100 | 0 | 320 | 128 | 80-80 | 4.90 |
| EX-V | 56 | 17.5 | 26 | 100 | 0 | 318 | 127 | 110-110 | 4.58 |
| EX-VI | 58.5 | 5.2 | 36.3 | 98.15 | 1.85 | 311 | 124 | 200-218 | 3.84 |

TABLE 2 polymer compositions and test results of comparative experiments. The amounts of the diamines and diacids are indicated in the mole % relative to the total molar amount of the diamines respectively of the diacids. N.a. means not applicable.

| | Diamines | | | Diacids | | Properties | | | |
|---|---|---|---|---|---|---|---|---|---|
| Comp. Exp. | C6 | C4 | C10 | T | C6 | Tm(° C.) | Tg(° C.) | VN1-VN2 (ml/g) | WA (wt. %) |
| CE-A | 100 | 0 | 0 | 63 | 37 | 318 | 100 | Gel-n.a. | 6.5 |
| CE-B | 56 | 44 | 0 | 100 | 0 | 332 | 131 | 35-n.a. | 6.5 |
| CE-C | 56 | 0 | 44 | 100 | 0 | 308 | 125 | Gel-n.a. | 3.3 |
| CE-D | 0 | 56 | 43 | 100 | 0 | 350 | 135 | 30-n.a. | 6.0 |
| CE-E | 75 | 25 | 0 | 84 | 16 | 326 | 117 | 75-70 | 7.0 |
| CE-F | 40 | 30 | 30 | 100 | 0 | 280 | 135 | 50-45 | 5.2 |

CE-A is a 6T/66 copolyamide, which shows a low Tg and high water absorption
CE-B is a 6T/4T copolyamide, which shows a too low Mw and high water absorption
CE-C is a 6T/10T copolyamide, which shows a much higher viscosity and lower stiffness at elevated temperature
CE-D is a 4T/10T copolyamide, which shows a too low Mw, high water absorption, a high melting temperature and a double melting peak, and degradation at melt processing conditions.
CE-E is a PA6T/4T/46 copolyamide, which shows a high water absorption
CE-F is a PA6T/4T/10T copolyamide, which shows a too low melting point.

The polymers according to the invention show a good balance in properties, do not show the above disadvantages, or in less extent, and can be prepared, without the need of taking further measures, with a sufficient high an stable Mw.

The invention claimed is:

1. A semi-aromatic polyamide comprising a diamine component (a) and a dicarboxylic acid component (b), wherein
   the diamine component (a) comprises, based on the total molar amount of the diamine component (a):
   (a1) 5-30 mole % of at least one C2-C5 diamine,
   (a2) 5-30 mole % of 1,10-decanediamine, and
   (a3) 50-90 mole % of a C6 diamine which consists of at least 75 mole %, relative to the total molar amount of C6 diamine, of 1,6-hexanediamine; and wherein
   the dicarboxylic acid component (b) comprises, based on the total molar amount of the dicaboxylic acid component (b):
   (b1) at least 60 mole % of terephthalic acid, and
   (b2) at most 40 mole % of another dicarboxylic acid, and wherein
   the semi-aromatic polyamide has a melting temperature (Tm) in a range of 310-340° C. as measured according to ASTM D3418-97 by differential scanning calorimetry (DSC) with a heating rate of 20° C./minute.

2. The semi-aromatic polyamide according to claim 1, wherein a molar amount of the 1,10-decanediamine is larger than a molar amount of the C2-C5 diamine.

3. The semi-aromatic polyamide according to claim 1, wherein the C2-C5 diamine is present in an amount of 5-15 mole %, and/or the 1,10-decanediamine is present in an amount of 10-25 mole %, relative to the total molar amount of the diamine component (a).

4. The semi-aromatic polyamide according to claim 1, wherein the C2-C5 diamine is 1,4-butane diamine.

5. The semi-aromatic polyamide according to claim 1, which comprises terephthalic acid in an amount of 60-90 mole %, relative to the molar amount of the dicaboxylic acid component (b).

6. The semi-aromatic polyamide according to claim 1, having a melting temperature (Tm) in the range of 310-330° C.

7. The semi-aromatic polyamide according to claim 1, having a glass transition temperature (Tg) in the range of 105-130° C.

8. A process for preparing the semi-aromatic polyamide according to claim 1, which comprises:
   a first step of preparing a prepolymer from a mixture of the dicarboxylic acid components (b1) and (b2), and the diamine components (a1) and (a3) while omitting from the mixture an amount of the 1,10-decanediamine component (a2) thereby resulting in a prepolymer comprising predominantly carboxylic acid end groups, and
   a second step of adding the amount of the 1,10-decanediamine component (a2) withheld from the mixture in the first step to a melt of the prepolymer formed by the first step and further polymerizing the prepolymer to thereby obtain the semi-aromatic polyamide polymer.

9. A polyamide composition, consisting of:
   (A) 30-100 wt. % of the semi-aromatic polyamide as in claim 1,
   (B) 0-70 wt. % of reinforcing agents and/or fillers, and
   (C) 0-50 wt % of other additives and/or other polymers.

10. A molded part consisting of a semi-aromatic polyamide according to claim 1.

* * * * *